(12) United States Patent
Wu

(10) Patent No.: US 6,218,841 B1
(45) Date of Patent: Apr. 17, 2001

(54) METHOD AND APPARATUS FOR DETERMINING DIP ANGLE, AND HORIZONTAL AND VERTICAL CONDUCTIVITIES USING MULTI FREQUENCY MEASURMENTS AND A MODEL

(75) Inventor: Jian-Qun Wu, Houston, TX (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 08/959,253

(22) Filed: Oct. 29, 1997

Related U.S. Application Data

(60) Provisional application No. 60/029,394, filed on Oct. 30, 1996.

(51) Int. Cl.[7] .............................. G01V 3/18; G01V 3/30; G06F 19/00
(52) U.S. Cl. ................................. 324/338; 702/7
(58) Field of Search .................................... 324/338, 339, 324/340, 341, 342, 343, 335, 337; 702/7, 10

(56) References Cited

U.S. PATENT DOCUMENTS 5,329,448 * 7/1994 Rosthal ................................ 324/339
5,781,436 * 7/1998 Forgang et al. ..................... 324/343

* cited by examiner

Primary Examiner—Walter E. Snow
(74) Attorney, Agent, or Firm—Melvin A. Hunn

(57) ABSTRACT

The present invention is directed to a method and apparatus for determining the dip angle and horizontal and vertical conductivities of a wellbore during drilling operations. If the dip angle is not known, the present invention allows for the use of multifrequency measurements and a model which maps dielectric permitivities to conductivities to calculate the horizontal conductivity, the vertical conductivity, the horizontal dielectric permitivity, the dielectric permitivity, and the dip angle. If the dip angle is known, the present invention allows a multifrequency tool to be utilized alone to calculate the horizontal conductivity, the vertical conductivity, the horizontal dielectric permitivity, and the vertical dielectric permitivity. I the dip angle is not known, a single frequency resistivity tool (as opposed to a multi-frequency tool) can be utilized in combination with a model which maps dielectric permitivities to conductivities to calculate the horizontal conductivity and the horizontal dielectric permitivity.

9 Claims, 10 Drawing Sheets

METHOD AND APPARATUS FOR DETERMINING DIP ANGLE, AND HORIZONTAL AND VERTICAL CONDUCTIVITIES USING MULTI FREQUENCY MEASURMENTS AND A MODEL

This application benefit of Provisional No 60/029,394, filed Oct. 30, 1996.

BACKGROUND OF THE INVENTION

1. Field of the Invention

The present invention relates in general to well-logging operations, and is particularly useful in anisotropic formations.

2. Description of the Prior Art

In oil and gas exploration, measurement-while-drilling or wireline systems are utilized to develop logs of the earth formations surrounding the borehole. In general, logging packages include: a transmission system that energizes the earth formations with either an electromagnetic field or currents, and at least one receiver system for monitoring the effect that the earth formations (and borehole) have on the field or current.

The electrical properties of the earth formations provide information about the geologic materials that make up the formations, and about their likely oil, gas, and water content. The most useful electrical attribute is resistivity (or conductivity). However, the dielectric property of the earth formations is also of interest.

Some earth formations are isotropic, which means that the earth formation does not preferentially conduct electricity in any particular direction. Other formations are anisotropic, which means that the earth formation may have a greater conductivity in one particular direction than in another particular direction. This is particularly true in many sedimentary geologic formations in which current flows more easily in the direction parallel to the bedding planes than transversely to them due to the fact that a number of mineral crystals are flat or elongated in shape, and they naturally took an orientation parallel to the plane of sedimentation when they were deposited.

In oil and gas exploration, the anisotropy of earth formations can be expressed as a horizontal conductivity, and a vertical conductivity which is transverse. Alternatively, an anisotropy coefficient ($\lambda$) can be utilized to quantify the anisotropy in accordance with Equation No. 1:

EQUATION NO. 1

$$\lambda = \sqrt{\sigma_h \sigma_v}$$

The determination of horizontal and vertical conductivities is complicated by directional drilling which generates boreholes that are at an angle relative to the earth formations. This angle is called relative dip angle and is often not known precisely.

Others have proposed techniques for determining conductivity in anisotropic formations. In an article by T. Hagiwara entitled "*A New Method to Determine Horizontal-Resistivity in Anisotropic Formations Without Prior Knowledge of Relative Dip*", presented on Jun. 16–19, 1996, at the SPWLA 37th Annual Logging Symposium, a technique is proposed which allows for the calculation of horizontal conductivity without any prior knowledge of the dip angle. This may reduce the dependence of logging-while-drilling operations on survey instruments.

One problem with the approach suggested by Hagiwara is that influence of the dielectric properties of the formation is largely ignored. In relatively high resistivity geologic formations (like oil-bearing sands) the impact of the dielectric effect increases in influence on the measurements from which conductivity is calculated. Also, the dielectric effect has a greater impact for high frequency interrogation signals.

SUMMARY OF THE INVENTION

It is one objective of the present invention to allow for the simultaneous measurement of horizontal and vertical resistivities, horizontal and vertical dielectric permitivity (or "constant"), and the dip angle using multiple frequency resistivity tools and using anisotropic formation models that relate dielectric permitivity to conductivities.

Alternatively, if the dip angle is known, the conductivities and dielectric constants can be measured using multifrequency tools without any anisotropic formation model. The measurements can also be used to verify the validity of the anisotropic formation models which relate horizontal and vertical formation conductivities to the dielectric permitivity. This is not practical with single frequency tools.

Alternatively, if the model which relates horizontal and vertical conductivities to the dielectric effect is known, this invention also allows one to obtain the horizontal resistivity, as well as the horizontal dielectric permitivity, using single frequency tools without knowing the dip angle in high resistivity zones or with high frequency interrogation signals. If the dip angle is known, the vertical resistivity and dielectric permitivity can also be measured.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

It has been shown by Hagiwara that, using resistivity tools with axial-dipole antennas, one can measure horizontal resistivity and a function of vertical resistivity and relative dip angle. Without additional information, the vertical resistivity and relative angle cannot be uniquely determined, no matter how many antenna spacings are used.

However, this is only true for low frequency tools. At higher frequencies, where the dielectric effect becomes important, even the horizontal resistivity cannot be determined with a single frequency measurement in deviated wells. The antenna readings are affected by five formation parameters: two resistivities, two dielectric constants (or "permitivities"), and dip angle. Four independent parameters derived from the five formation parameters completely determine the antenna readings. They are horizontal resistivity, horizontal dielectric permitivity, a function of vertical resistivity and relative dip angle, and the same function of vertical dielectric permitivity and relative dip angle. With a single frequency, the contributions from displacement and conduction currents in the formation to the measurements cannot be, as a practical matter, separated. Since the effects of dielectric permitivity and resistivity on wave number vary differently with frequency, in accordance with the present invention, with multiple frequency measurements one can obtain the four parameters. However, these four alone cannot determine all five formation parameters.

One other function or equation is necessary in order to determine all five parameters. The function or equation that allows the determination of all five formation parameters is the relationship between conductivity and the dielectric effect. The factors that cause macroscopic conductivity anisotropy necessarily cause dielectric anisotropy. The anisotropic dielectric permitivities and conductivities are not independent of each other. Once the relationship between them is established for a given formation type, one can use the four measurements, plus a formation anisotropy model (or chart, or formula), to uniquely determine all five parameters. Of course, if the relative dip angle is known, the resistivities and dielectric permitivities can be determined without any formation models.

Figure 1:
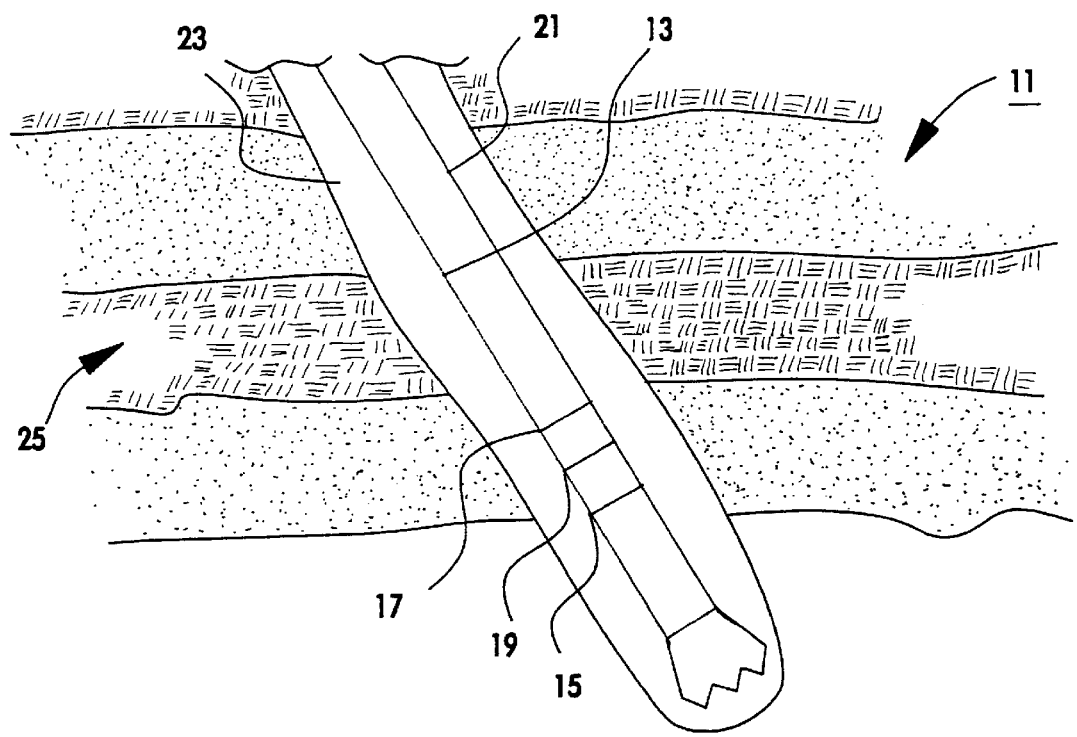
FIG. 1 depicts a drillstring which includes a logging-while-drilling system.

As depicted in FIG. 1, in accordance with the preferred embodiment of the present invention, a logging-while-drilling system 11 is provided and coupled to drillstring 21 which extends into borehole 23. As is shown, borehole 23 extends at an angle through earth formation 25 which, for example, is composed of alternating layers of sand and shale deposits. It includes at least one transmitter 13, 15 for generating interrogating electromagnetic fields. Preferably, the at least one transmitter 13, 15 can generate interrogating electromagnetic fields having different frequencies. The logging-while-drilling system 11 also includes at least one receiver for detecting the effect of the earth formations (and borehole) on the interrogating electromagnetic fields. Preferably, a differential receiver is utilized which includes two spaced-apart receiver antennas 17, 19 and reception circuitry for detecting current induced in the receiver antennas 17, 19.

As is conventional, logging-while-drilling system 11 is capable of measuring any of the following electrical attributes which can be utilized to measure any combination of the following, utilizing at least two interrogation frequencies:

(1) the amplitude attenuation of the interrogating electromagnetic field;

(2) the phase shift of the interrogating electromagnetic field; and (3) the in-phase and out-of-phase components under phase quadrature analysis.

In addition to the measurements, the present invention requires that a model (formula, chart, table, etc.) be developed (or, alternatively, the use of an existing model) that relates (or "maps") the dielectric "constants" or "permitivities" of a particular type of earth formation to particular anisotropic conductivities.

The present invention allows for the following particular uses:

1. If the dip angle is not known, the present invention allows for the use of (1) the multifrequency measurements, and (2) the model which maps dielectric permitivities to conductivities, to calculate:

(1) the horizontal conductivity;

(2) the vertical conductivity;

(3) the horizontal dielectric permitivity;

(4) the vertical dielectric permitivity; and (5) the dip angle.

2. If the dip angle is known, a multifrequency resistivity tool can be utilized alone (that is, without the availability of the model which maps dielectric permitivities to conductivities) to calculate:

(1) the horizontal conductivity;

(2) the vertical conductivity;

(3) the horizontal dielectric permitivity; and (4) the vertical dielectric permitivity.

3. If the dip angle is not known, a single frequency resistivity tool (as opposed to a multifrequency tool) can be utilized in combination with the model which maps dielectric permativities to conductivities to calculate:

(1) the horizontal conductivity; and (2) the horizontal dielectric permativity.

How these commercially advantageous uses can be obtained utilizing the present invention will now be described.

The log response of an induction tool with axial dipole antennas to an anisotropic formation is described by Equation No. 2:

EQUATION NO. 2

$$v \sim \frac{1}{L^3}[-2(1 - i \cdot k_h \cdot L)e^{i \cdot k_h \cdot L} + (i \cdot k_h \cdot L) \cdot (e^{i \cdot k_v \cdot S} - e^{i \cdot k_h \cdot L})]$$

wherein the induced voltage "V" is expressed in terms of three parameters of Equations 3, 4, and 5, as follows:

EQUATION NO. 3

$$k_v \cdot S = k_h \cdot L \cdot \beta$$

EQUATION NO. 4

$$S = \sqrt{\sin^2\theta + \frac{k_h^2}{k_v^2} \cdot \cos^2 \cdot L}$$

EQUATION NO. 5

$$\beta = \sqrt{\cos^2\theta + \frac{k_v^2}{k_h^2} \cdot \sin^2\theta}$$

wherein:

Θ represents the dip angle $k_h$ represents the complex wave number in the horizontal direction $k_v$ represents the complex wave number in the vertical direction L represents the spacing between a transmitter and a receiver S represents the rescaled distance in an anisotropic medium The values for $k_h$ and $k_v$ can be determined from the following Equations No. 6 and 7:

EQUATION NO. 6

$$k_h(\omega) = \sqrt{\epsilon_h \cdot \mu_h \cdot \omega^2 + i \cdot \mu_h \cdot \sigma_h \cdot \omega}$$

EQUATION NO. 7

$$k_v(\omega) = \sqrt{e_v \cdot \mu_v \cdot \omega^2 + i \cdot \mu_v \cdot \sigma_v \cdot \omega}$$

Equation No. 5 can be restated as Equation No. 8:

EQUATION NO. 8

$$\beta^2(\omega) = 1 + \frac{[(\mu_v \cdot \epsilon_v - \mu_h \epsilon_h)\sin^2\theta]\omega^2 + i[(\mu_v \cdot \sigma_v - \mu_h \cdot \sigma_h)\sin^2\theta]\omega}{\mu_h \cdot \epsilon_h \cdot \omega^2 + i \cdot \mu_h \cdot \sigma_h \cdot \omega}$$

If the relative magnetic permeability is assumed to be 1 (which is a fair assumption for non-ferrous formations), Equation No. 8 can be restated as Equation No. 9:

EQUATION NO. 9

$$\beta^2(\omega) = 1 + \frac{[(\epsilon_v - {}_h\epsilon_h)\sin^2\theta]\omega^2 + i[(\sigma_v - \sigma_h)\sin^2\theta]\omega}{\epsilon_h \cdot \omega^2 + i \cdot \sigma_h \cdot \omega}.$$

In formations where the CRIM model (which is a model that relates resistivity to dielectric permitivity, as described in U.S. Pat. No. 5,144,245, "Method for Evaluating a Borehole Formation Based on a Formation Resistivity Log Generated by a Wave Propagation Formation Evaluation Tool", to M. Wisler, and owned by Baker Hughes Incorporated, and incorporated herein by reference) applies, the dielectric permitivity is related to the formation conductivity through Equation No. 10, as follows:

EQUATION NO. 10

$$\epsilon = c\sigma^a$$

where $\epsilon$ is the dielectric constant, a is the formation conductivity, c and a are constants. At 2 MHz, c=210 and a=−0.43. At 400 KHz, a is slightly different and c is about twice of its value at 2 MHz. Since the dielectric effect at 400 MHz is much smaller than that of 2 MHz, it is a good approximation to assume both c and a as being independent of frequency for MPR tool measurements. This approximation is made for simplicity of arguments. Any known frequency dependency used in the CRIM model would only increase the mathematical complexity of the application of the invention. It would not change the essence of the invention. In the present invention the "model" which releases relates resistivity to dielectric permitivity may be a data file maintained in electronic or semiconductor memory which is accessible through machine readable program instruction, or it may constitute one or more equations and/or constants also stored in memory.

The compensated long spacing phase differences and amplitude ratios at 400 KHz and 2 MHz are p400k, a400k, p2m, a2m. They can be used through an inversion method to obtain the four parameters in accordance with Equations Nos. 11–14, as follows:

EQUATION NO. 11

$$M1 = \epsilon_h$$

EQUATION NO. 12

$$M2 = \sigma_h$$

EQUATION NO. 13

$$M3 = (\epsilon_v - \epsilon_h)\sin^2\theta$$

EQUATION NO. 14

$$M4 = (\sigma_v - \sigma_h)\sin^2\theta$$

Figure 2:
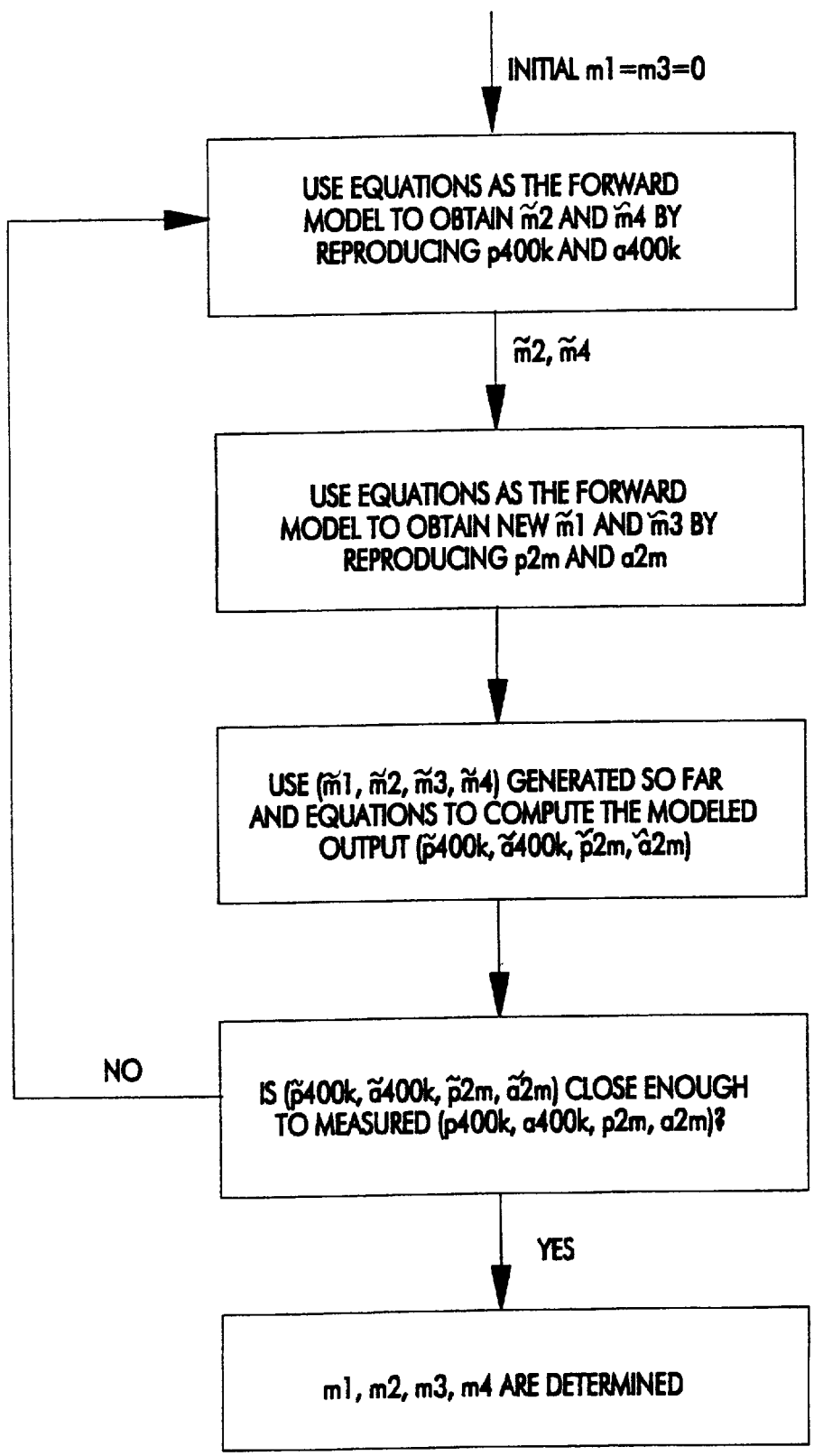
FIG. 2 is a flow chart representation of the implementation of the present invention.

The inversion involves four parameters (and is thus "four-dimensional") and can be extremely complicated. An effective inversion method is an iterative one which reduces the four-dimensional inversion into a series of two-dimensional inversions which have been used in the prior art. Since the dielectric effect on the lower frequency measurements is small, one starts by assuming that there is no dielectric effect on the 400 KHz measurements. The two lower frequency measurements are used to obtain m2 and m4. Then the two 2 MHz measurements are used to determine the remaining two parameters, m1 and m3. The non-zero m1 and m3 are then used to refine m2 and m4 by a new 400 KHz inversion. The newly obtained m2 and m4 are used in the 2 MHz inversion to update m1 and m3. This process continues until a predetermined accuracy is achieved. The attached flow chart of FIG. 2 shows how the 4-d inversion process works.

After the inversion, we have the following Equations Nos. 15–18.

EQUATION NO. 15

$$M1 = \epsilon_h$$

EQUATION NO. 16

$$M2 = \sigma_h$$

EQUATION NO. 17

$$M3 = (\epsilon_v - \epsilon_h)\sin^2\theta$$

EQUATION NO. 18

$$M4 = (\sigma_v - \sigma_h)\sin^2\theta$$

where m1, m2, m3, m4 are the results of inversion. The horizontal dielectric permittivity and resistivity are determined.

Using the CRIM model we have Equation Nos. 19 and 20.

EQUATION NO. 19

$$M3 = c(\sigma_v^a - \sigma_h^a)\sin^2\theta = c(\sigma_v^a - M2^a)\sin^2\theta$$

EQUATION NO. 20

$$M4 = (\sigma_v - \sigma_h)\sin^2\theta = (\sigma_v - M2)\sin^2\theta$$

The ratio of the above two equations gives us Equation No. 21, as follows:

EQUATION NO. 21

$$\frac{M3}{M4} = \frac{c(\sigma_v^a - M_2^a)}{\sigma_v - M_2}$$

This equation is used to calculate $\sigma_v$ through a trivial one-dimensional inversion. Using the CRIM model, $\epsilon_v$ is calculated. So we have determined $\epsilon_h$, $\epsilon_v$, $\sigma_v$, $\sigma_h$. Using either Equation 17 or 18, the dip angle is determined.

The apparatus that can be utilized to implement the present invention will now be described with reference to FIGS. 3 through 7C.

Transmission and Reception Systems

Figure 3:
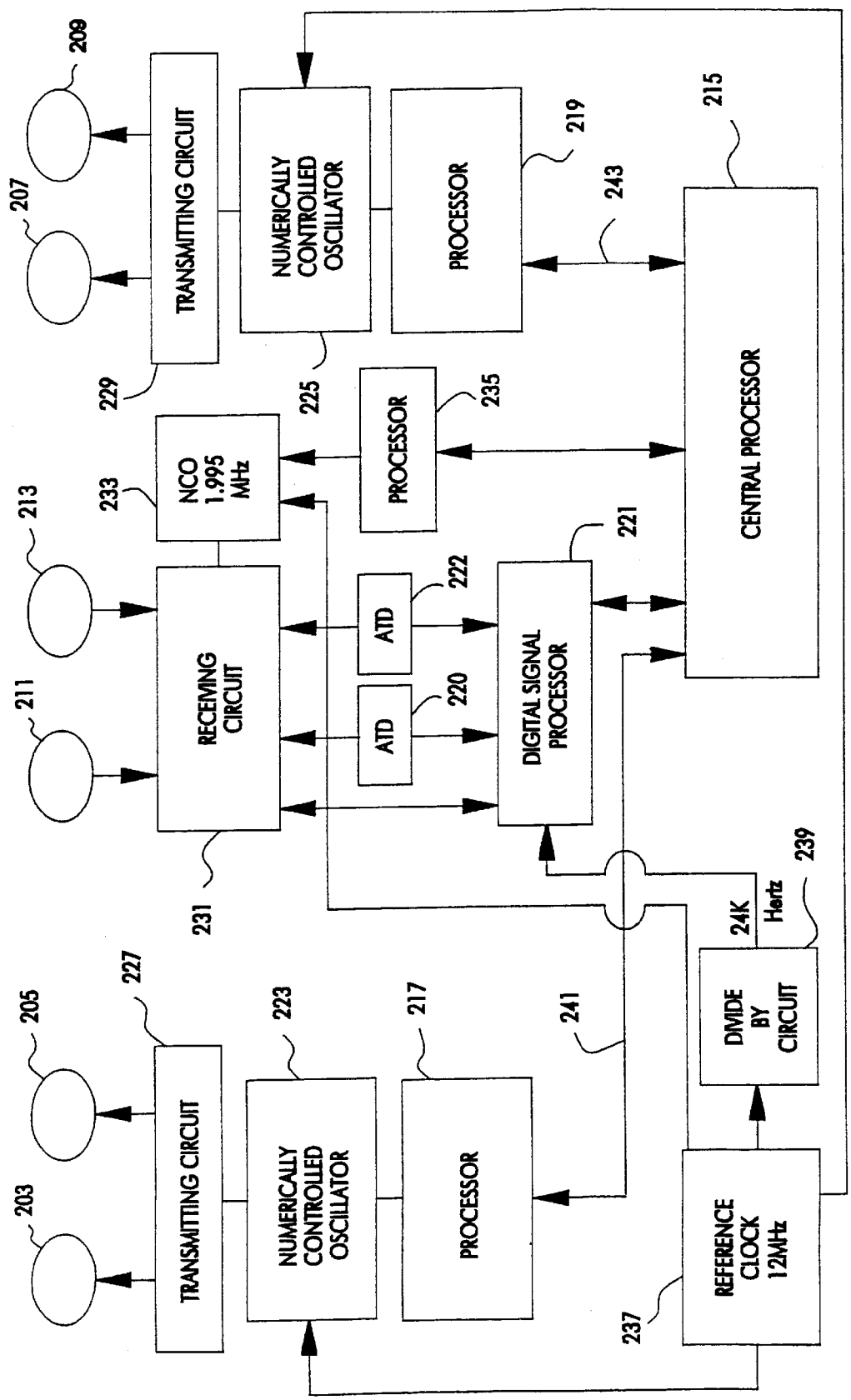
FIGS. 3 through 7C depict a logging-while-drilling tool that can be utilized to implement the present invention.

FIG. 3 provides a block diagram view of an exemplary logging tool 201 constructed in accordance with the present invention. Logging tool 201 includes upper transmitters 203, 205, lower transmitters 207, 209, and intermediate series resonant receiving antennas 211, 213. Central processor 215 is preferably a microprocessor device which is utilized to coordinate the operation of the components of logging tool 201, to record and process the data obtained from measurements made by intermediate series resonant receiving antennas 211, 213, and to interact with the mud pulse telemetry data transmission system carried in the adjoining drill collar member. Processor 217 is provided and dedicated for the control of numerically controlled oscillator 223. Processor 219 is provided and dedicated for the control of numerically controlled oscillator 225. Central processor 215 communicates with processors 217, 219 via data buses 241, 243 respectively. Numerically controlled oscillators 223, 225 are adapted to receive a binary command signal as an input, and to produce an analog output having particular frequency, phase, and amplitude attributes. The frequency, phase, and amplitude attributes are determined at least in part by the command signals applied from processor 217, 219 to the input of numerically controlled oscillators 223, 225, and the data contained in various registers within numerically controlled oscillators 223, 225. Numerically controlled oscillators 223, 225 provide the analog signal to transmitting circuits 227, 229 respectively.

Receiving antennas 211, 213, communicate through analog receiving circuit 231 with the first and second data input channels of a digital signal processor 221. The digital signal processor 221 receives data at the first and second inputs after it is converted from analog form to digital form by analog-to-digital converters 220, 222, and records the data elements in a circular memory buffer. Central processor 215 pulls data from the buffers in a prescribed and predetermined manner in order to sample the current which is generated in receiving antennas 211, 213 in response to the propagation of electromagnetic signal through the adjoining formation. As is conventional, the resistivity of the formation surrounding the logging tool 201 may be determined by either (1) determining the amplitude attenuation of an electromagnetic wave propagating through the formation adjoining receiving antenna 211 and receiving antenna 213, or (2) by determining the phase shift between the electromagnetic signal propagating through the formation adjoining receiving antenna 211 and 213, or from both. These measurements comprise a relative measurement of the amplitude attenuation and a relative measure of the phase shift.

The present invention also allows other techniques for quantifying the electromagnetic field which propagates through the formation surrounding logging tool 201. Since precise control can be obtained with the present invention over the frequency, phase, and amplitude of the electromagnetic wave generated by transmitting antennas 203, 205, 207, and 209, the present invention allows the measurement of the absolute amplitude attenuation of electromagnetic signal between any particular transmitting antenna 203, 205, 207, and 209 and any particular receiving antenna 211, 213. Furthermore, the logging tool 201 of the present invention allows for the absolute measurement of the phase shift of an electromagnetic signal between any particular transmitting antenna 203, 205, 207, 209 and any particular receiving antenna 211, 213. Prior art devices do not allow such optional techniques for determining amplitude attenuation and phase shift, since prior art devices are unable to determine easily and precisely the frequency, phase, and amplitude of a signal generated at any particular transmitting antenna.

The operation of numerically controlled oscillators 223, 225 is clocked by the output of reference clock 237, which is preferably 12 megaHertz. The operation of receiving circuit 231 is controlled by the output of numerically controlled oscillator 231, which is also clocked by the output of the reference clock 237, which is 12 megaHertz. Thus, a clocking pulse is provided to numerically controlled oscillator 223, 225 at a frequency identical to that which is provided to numerically controlled oscillator 223, which establishes the operating frequency of receiving circuit 231. Digital signal processor 221 is clocked by the output of divide-by circuit 239, and thus samples the output of receiving circuit 231 at a particular frequency which is much less than that utilized to energize transmitter antennas 203, 205, 207 and 209.

Numerically controlled oscillator 233 produces a phase-locked sine-wave signal with a center frequency of 1.995 Mhz, that is used as a local oscillator signal by receiving circuit located in electronics housing 73.

Figure 4:
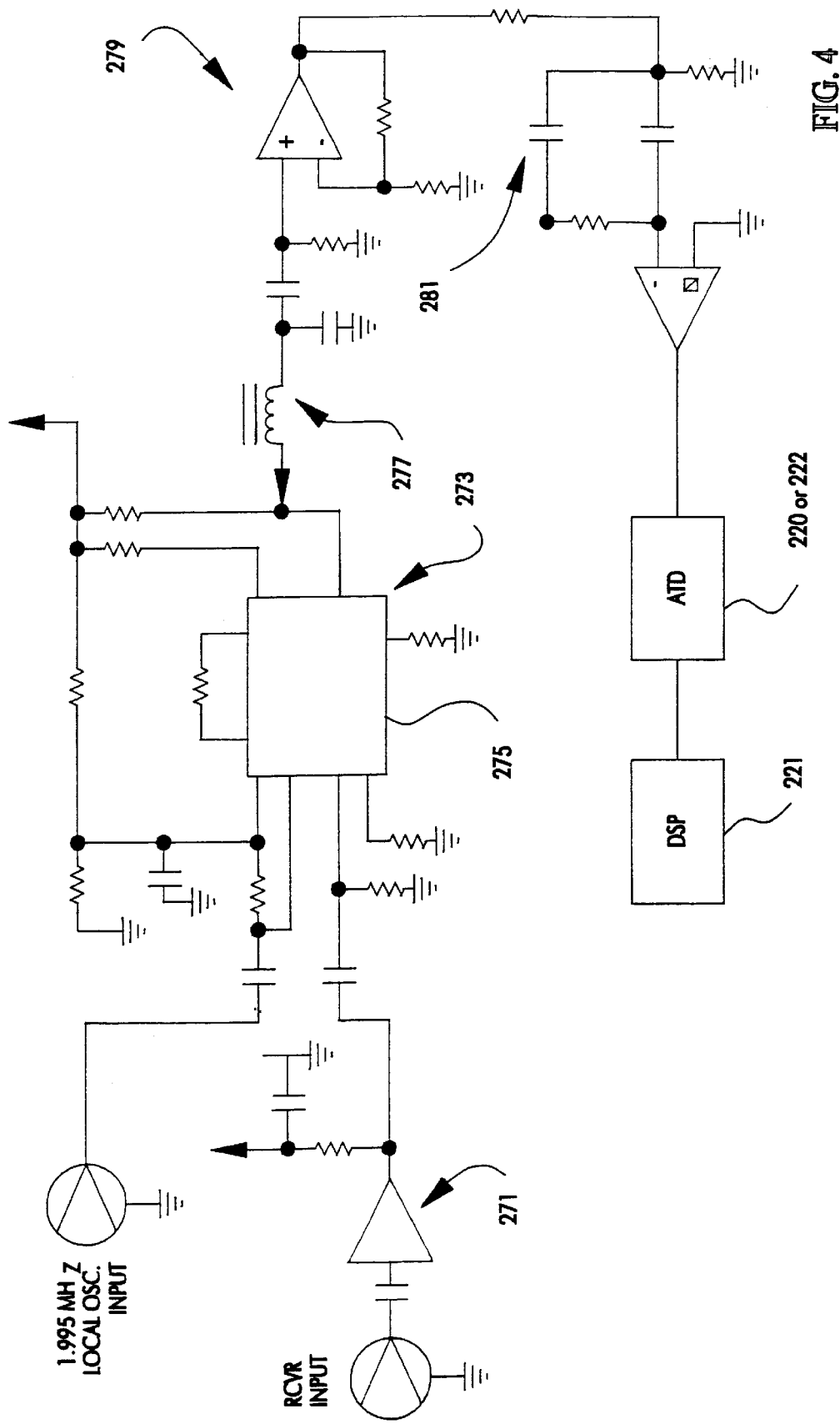

Reference is now made to FIG. 4. The overall function of the circuitry depicted in block diagram and schematic form in FIG. 4 is to respond to the local oscillator signal and one of the two receiver coil output signals to produce a receiver phase output signal relative to the transmitter and a receiver amplitude output signal. A conventional pre-amp circuit generally indicated at 271 responds to the receiver pick-up signal and its output is applied to a mixer circuit arrangement generally indicated at 273. Mixer circuit arrangement 273 includes an integrated circuit 275 that suitably is implemented by an integrated circuit manufactured and sold by Motorola and other companies under the designation MC 1596.

Because the frequency of the pick-up signal and the local oscillator signals are phase-locked to a common frequency reference and differ by 6 Khz, the intermediate frequency (IF) produced by mixer circuit arrangement 273 is at 6 Khz. A band pass tuning circuit arrangement generally indicated at 277 passes the 6 Khz IF signal to an amplifier circuit arrangement generally indicated at 279. An active band pass filter circuit arrangement generally indicated at 281 provides further band pass filtering and provides a signal to an analog-to-digital converter, which supplies a digital input to a particular input channel of digital signal processor 221 (of FIG. 3).

Figure 5A:
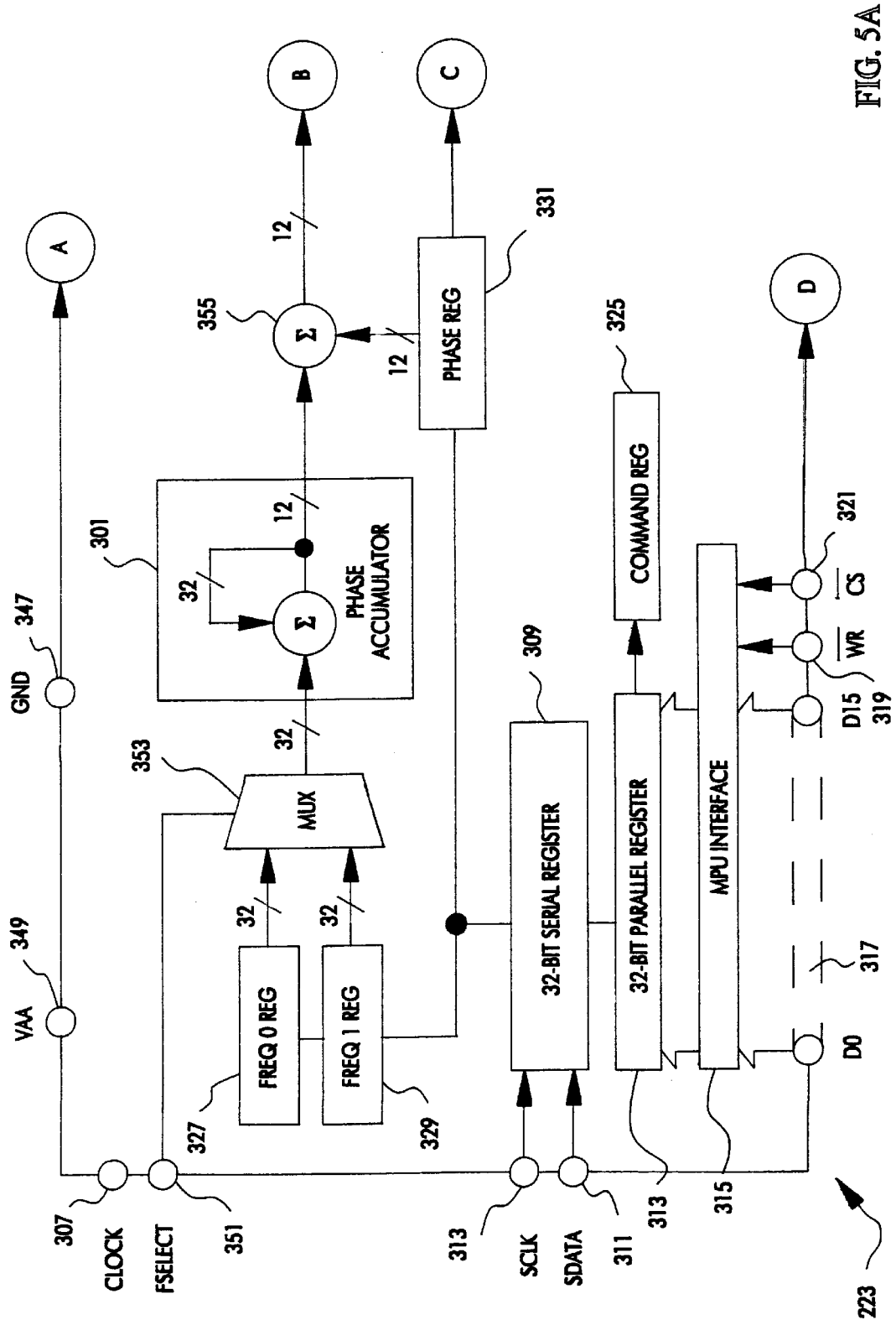
Figure 5B:
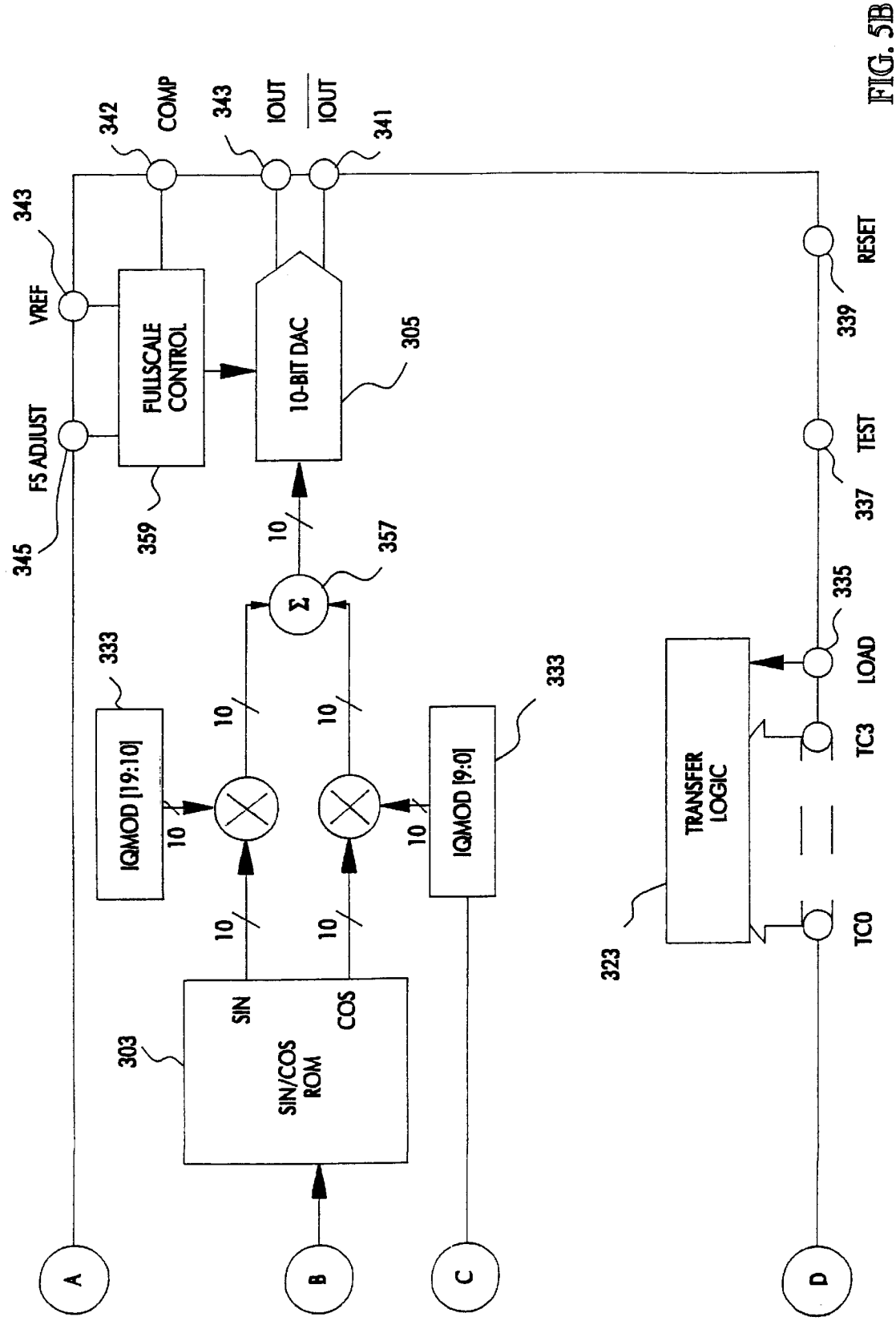

FIGS. 5A and 5B is a block diagram view of the numerically-controlled oscillators 223, 225, 233 of FIG. 3. Since the numerically-controlled oscillators are identical, only numerically-controlled oscillator 223 will be discussed and described. In the preferred embodiment of the present invention, numerically-controlled oscillator 223 comprises a CMOS, DDS modulator manufactured by Analog Devices of Norwood, Mass., which is identified by Model No. AD7008. The numerically-controlled oscillator 223 includes a thirty-two bit phase accumulator 301, a sine and cosine look-up table 303, and a ten-bit digital to analog converter 305. Clock input 307 is provided to receive a clocking signal from a device which is external to the numerically-controlled oscillator 223. The particular numerically-controlled oscillator of the present invention is adapted to accept clock rates as high as twenty megaHertz to fifty megaHertz, but can accommodate much lower clock rates. The device purports to have a frequency accuracy which can be controlled to one part in four billion. Numerically-controlled oscillator 223 includes a thirty-two bit serial register 309 which receives serial data at serial data input pin 311, which is clocked into the register in accordance with a clock signal which is supplied to serial clock input 313. A thirty-two bit parallel register 313 is also provided which receives parallel binary data from MPU interface 315. Data bus 317 includes sixteen digital input pins identified as D0 through D15. The chip select pin 321 is utilized when writing to the parallel register 313. The write pin 319 is also utilized when writing to the parallel register 309. The transfer control address bus 323 is utilized to determine the source and destination registers that are used during a transfer. A source register can be either the parallel assembly register 313 or the serial assembly register 309. The destination register can be any one of the following registers: the command register 325, the FREQ0 register 327, the FREQ1 register 329, the phase register 331, the IQMOD register 333. The command register is written to only through the parallel assembly register 313. The contents of the command register determine the operating state of the numerically-controlled oscillator 223. In the preferred device utilized in the present invention, the command register is a four bit register. The content of this register determines the operating state of the numerically-controlled oscillator. During logging operations, the logging apparatus of the present invention is programmed to provide commands from processors 215, 217, 219 (of FIG. 3) with eight-bit commands, so the "CR0" bit is 0. Normal operation is desired, so the "CR1" bit is 0. In the present invention, amplitude modulation is bypassed, so the "CR2" bit is 0. In the present invention, the synchronizer logic is enabled, so the "CR3" bit is 0. The FREQ0 register 327 defines the output frequency of the numerically-controlled oscillator 223, when the FSELECT pin is 1, as a fraction of the frequency of the clock signal applied to clock pin 307. The FREQ1 register 329 defines the output frequency of the numerically-controlled oscillator 223, when FSELECT equals 1, as a frequency of the clock signal applied to clock pin 307. The contents of the phase register 331 are added to the output of the phase accumulator 301. The IQMOD register 333 is not utilized in the present invention.

The operations can be performed with the registers by supplying command signals to transfer control address bus 323. Three basic operations can be performed. The contents of the parallel assembly register 313 can be transferred to command register 325; the contents of the parallel assembly register can be transferred to a selected destination register; and the contents of the serial assembly register 309 can be transferred to a selected destination register.

The load register pin 335 is utilized in conjunction with the transfer control address bus 323 to control loading of internal registers from either the parallel or serial assembly registers 309, 313. The test pin 337 is utilized only for factory testing. The reset pin 339 is utilized to reset the registers. The reset pin in particular is utilized to clear the command register 325 and all the modulation registers to 0. The current output pins 341, 343 are utilized to supply an alternating current to a selected end device. In the particular embodiment of the present invention, only one of these outputs is utilized for a particular transmitting antenna, since one current is the compliment of the other current. The compensation pin 342 is utilized to compensate for the internal reference amplifier. The voltage reference pin 343 can be utilized to override an internal voltage reference, if required. The full-scale adjust pin 345 determines the magnitude of the full scale current at output pins 341, 343. The ground pin 347 provides a ground reference, while the positive power supply pin provides power for the analog components within numerically-controlled oscillator 323. The frequency select pin 351 controls frequency registers FREQ0 register 327 and FREQ1 register 329, by determining which register is used in the phase accumulator 301 by controlling multiplexer 353. The contents of phase register 331 is added to the output of phase accumulator 301 at sumer 355. The IQMOD registers 333 are provided to allow for either quadrature amplitude modulation or amplitude modulation, so the sine and cosine outputs of look-up table 303 are added together at sumer 357, and are unaffected by the IQMOD registers 333. The output of sumer 357 is provided to digital-to-analog converter 305, which creates an analog signal having a frequency which corresponds to either the contents of the FREQ0 register 327 or the FREQ1 register 329, a phase which is determined by the output of sumer 355 which is provided as an input to look-up table 303, and an amplitude which is determined by full scale control 359 which is set by full scale adjust pin 345 and reference voltage pin 343. Therefore, the numerically-controlled oscillator of FIGS. 5A and 5B can provide an analog output having a precise frequency attribute, phase attribute, and amplitude attribute. Since the device is extremely accurate, it is possible to provide a driving current for the transmitting antennas 203, 205, 207, 209 of FIG. 3 which is controlled precisely. In the preferred embodiment of the present invention, one of transmitting antennas 203, 205 is operated at 400 kiloHertz, while the other of transmitting antennas 203, 205 is operated at 2 megaHertz. The same is true for antennas 207, 209, with one being operated at 400 kiloHertz and the other being operated at 2 megaHertz. However, the processors 215, 217, 219 can be programmed to provide any particular frequencies for the transmitting antennas. This will be used to good advantage as will be described below in connection with a calibration routine.

In operation, a command signal is supplied to the FSELECT pin 351 to determine which frequency will be utilized for energizing a particular transmitting antenna. The FREQ0 register 327 and FREQ1 register 329 may be preloaded with two particular frequencies (such as 400 kilohertz and 2 megaHertz). The binary signal applied to the FSELECT pin 351 determines the operation of multiplexer 353, which supplies the contents of either FREQ0 register 327 or FREQ1 register 329 of the input of phase accumulator 301. Phase accumulator 301 accumulates a phase step on each clock cycle. The value of the phase step determines how many clock cycles are required for the phase accumulator to count two n radians, that is, one cycle of the output frequency. The output frequency is determined by the phase step multiplied by the frequency of the signal applied to the clock input pin 307 divided by $2^{32}$. In practice, the phase accumulator 301 is cleared, then loaded with the output of multiplexer 353. Then, a predefined time interval is allowed to pass, during which the signal applied to clock input pin 307 steps the output of phase accumulator 301 through an incrementally increasing phase for the particular frequency. In other words, phase accumulator steps from 0° phase to 180° for a particular frequency. At any time, the output of phase accumulator 301 may be altered by a phase offset which is supplied by phase register 331. Phase register 331 may be loaded in response to commands from processors 215, 217, 219. The phase value is supplied as input to look-up table 303, which converts the output of the phase accumulator 301 (and any desired offset) into a digital bit stream which is representative of an analog signal. This digital bit stream is supplied as an input to the 10-bit digital-to-analog converter 305 which also receives amplitude information from full scale control 359. The digital-to-analog converter 305 supplies an analog output with a particular frequency attribute, phase attribute, and amplitude attribute. For example, an output of 2 megaHertz, with 15° of phase, and a particular peak amplitude current may be provided as an input to a particular transmitting antenna.

Figure 6:
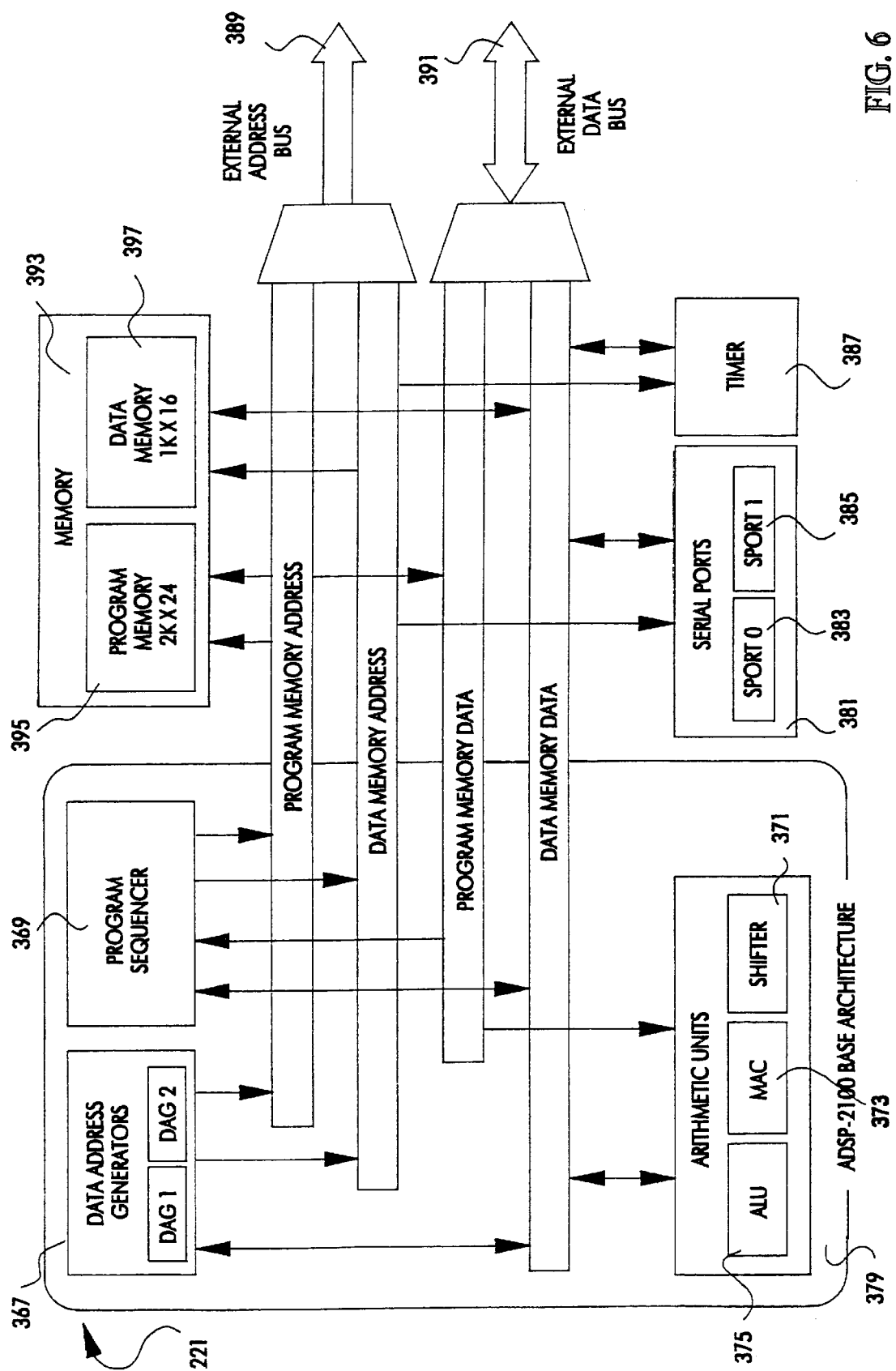

FIG. 6 is a block diagram view of the digital signal processor 221 of FIG. 3. In the preferred embodiment of the present invention, digital signal processor 221 comprises a DSP microcomputer manufactured by Analog Devices of Norwood, Mass., which is identified as Model No. ADSP-2101. This is a single-chip microcomputer which is utilized for high-speed numeric processing applications. Its base architecture 379 is a fully compatible superset of the ADSP-2100 instruction set. The base architecture includes three independent computational units: shifter 371, multiplier/accumulator 373, and arithmetic and logic unit (ALU) 375. Program sequencer 369 supports a variety of operations including conditional jumps, subroutine calls, and returns in a single cycle. Data address generator 367 includes two address generators. Digital signal processor 221 includes serial port 381 which includes two input channels: input channel 383, and input channel 385. Timer 387 provides timing signals for the data processing operation, and receives as an input a clock signal from divide-by circuit 239 (of FIG. 3). External address bus 289 and external data bus 391 allow digital communication between digital signal processor 221 and central processor 315 of FIG. 6. Memory 393 includes program memory 395 and data memory 397. As is typical with digital signal processors, data memory 397 defines at least two circular buffers associated with serial ports 383, 385, which are designed to receive asynchronous digital data, and store it indefinitely or for a predetermined time interval. The digital signal processor 221 receives digital inputs at channel inputs 383, 385 from an analog-to-digital converter, such as is depicted in the circuit of FIG. 6. The receiving circuit of FIG. 6 receives a current which is representative of the response of a particular receiving antenna 211, 213 to electromagnetic radiation propagating through the borehole. This electrical signal is processed through the circuit components of FIG. 6, and is provided as an input to digital signal processor 221. In the preferred embodiment of the present invention, receiving antenna 211 is identified with a particular input channel of digital processor 221, while receiving antenna 213 is identified with the other input channel of digital signal processor 221. Central processor 215 (of FIG. 3) utilizes external address bus 389 and external data bus 391 to address a particular input channel and read digital data into central processor 215 for processing. In the preferred embodiment of the present invention, digital signal processor 221 can sample data from receiving antennas 211, 213 at a very high sampling rate, which can be read periodically by central processor 215 which processes the data to determine the amplitude attenuation and phase shift of the electromagnetic signal which is propagated through the borehole. One particular routine for calculating amplitude attenuation and phase shift is set forth in greater detail herebelow, in connection with a discussion of the error cancellation feature of the present invention. In broad overview, central processor 215 can pull a selected amount of data from each channel of digital signal processor 221, and from that data calculate the amplitude attenuation and phase shift of the electromagnetic wave as it propagates through the wellbore and past receiving antenna 211 and receiving antenna 213. In the preferred embodiment of the present invention, an upper transmitter transmits an interrogating electromagnetic signal of a particular frequency which propagates downward past receiving antennas 211, 213. Then, a particular one of lower transmitting antennas 207, 209 propagate an interrogating electromagnetic signal upward. Measurements from receiving circuit 231 are stored in the input channels of digital signal processor 221, and read by central processor 215 in a manner which allows for the calculation of amplitude attenuation and phase shift.

Another important feature of the present invention arises from the fact that a precise energizing current can be utilized to energize a particular one of transmitting antennas 203, 205, 207, 209. This will establish the frequency attribute, phase attribute, and amplitude attribute of the electromagnetic interrogating signal. Therefore, a single receiving antenna can be utilized to make the measurement of the electromagnetic interrogating signal as it passes through the wellbore. The amplitude and phase of that interrogating signal can be recorded in memory, and compared with values in memory for the energizing current. This allows a single receiving antenna to be used to provide an accurate measure of amplitude attenuation between that particular receiving antenna and the particular transmitting antenna, and the phase shift of the interrogating signal between the transmitting antenna and the receiving antenna. Of course, the amplitude attenuation and phase shift of the electromagnetic interrogating signal as it passes through the formation is indicative of the resistivity of the wellbore and surrounding formation.

Figure 7A:
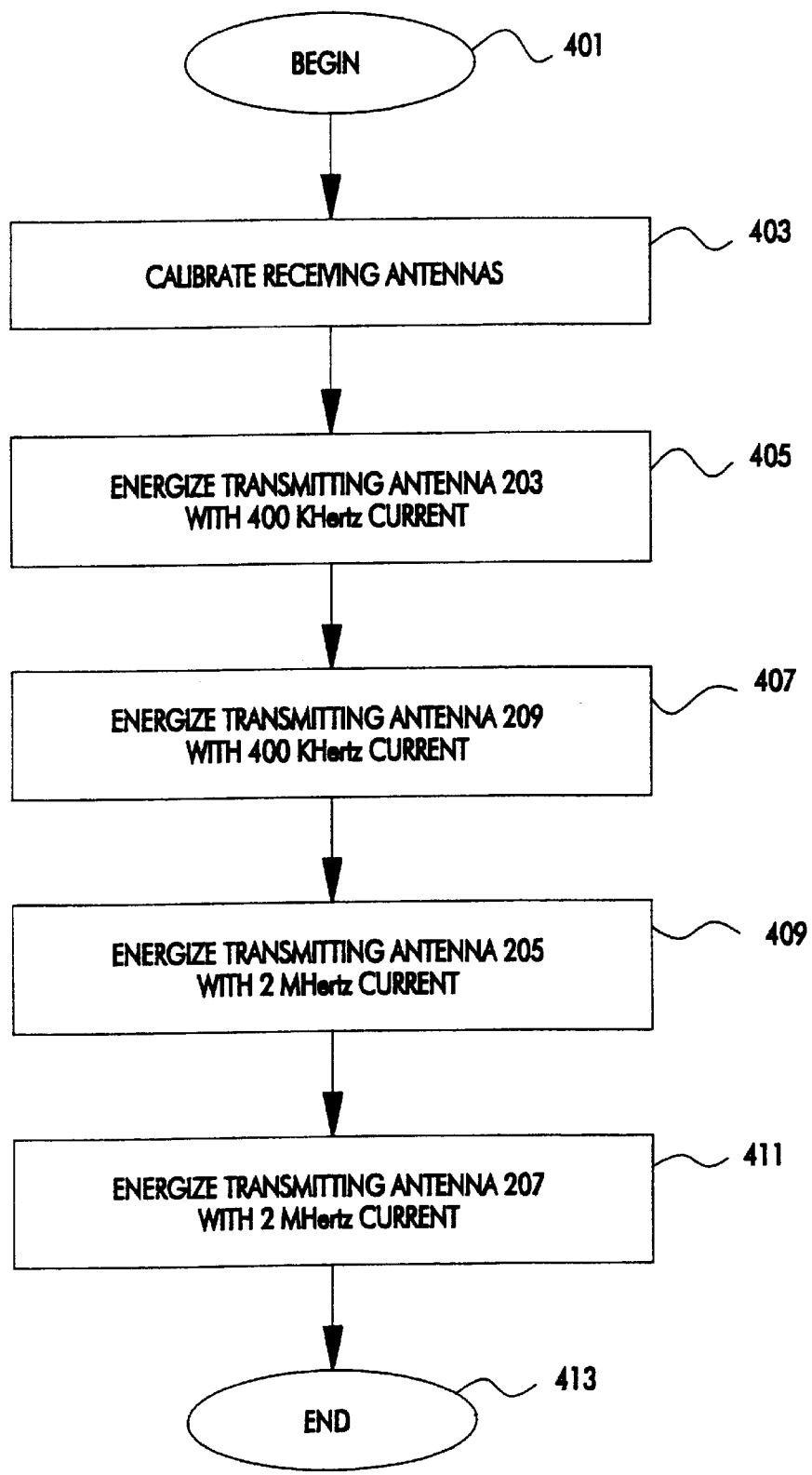
Figure 7B:
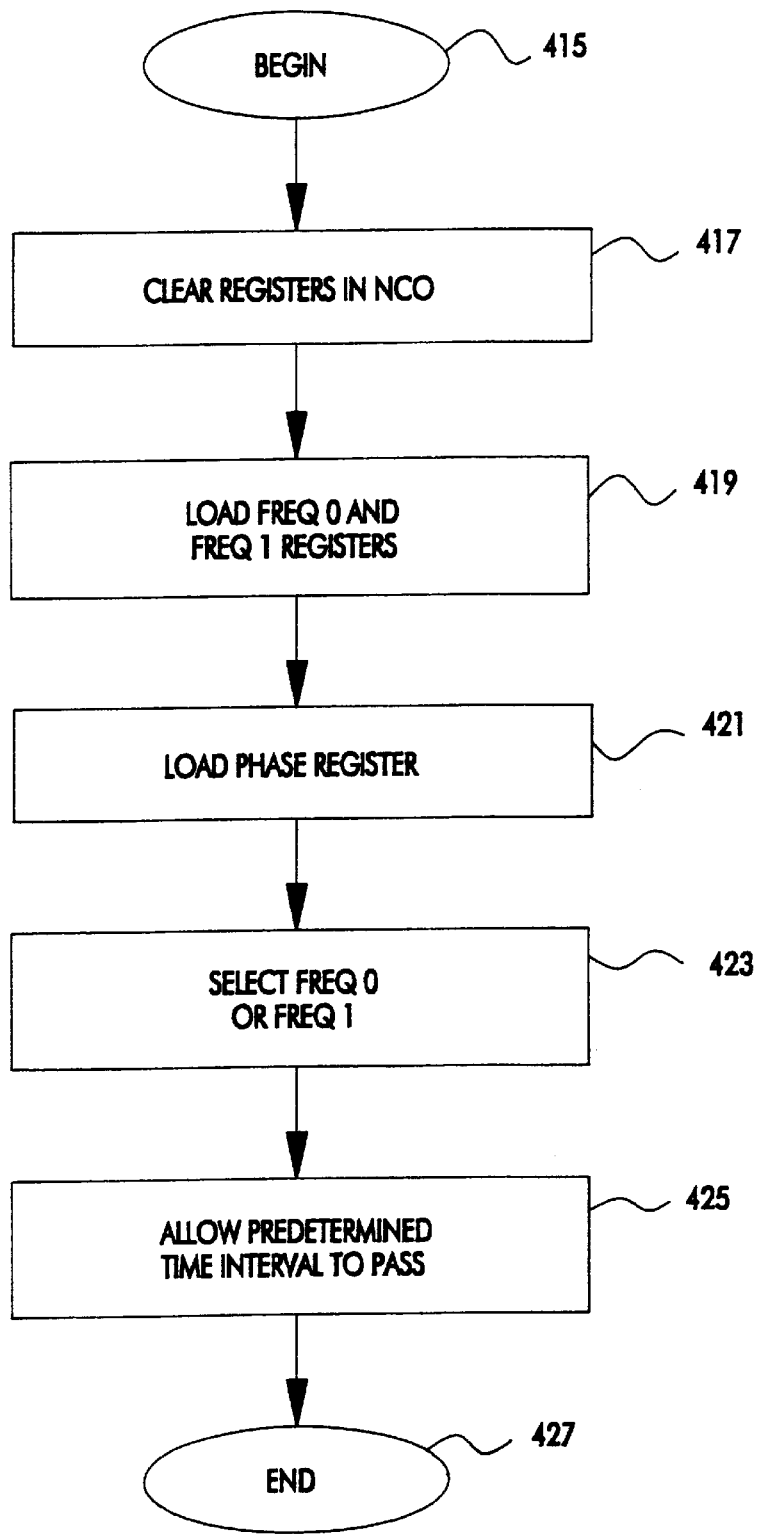
Figure 7C:
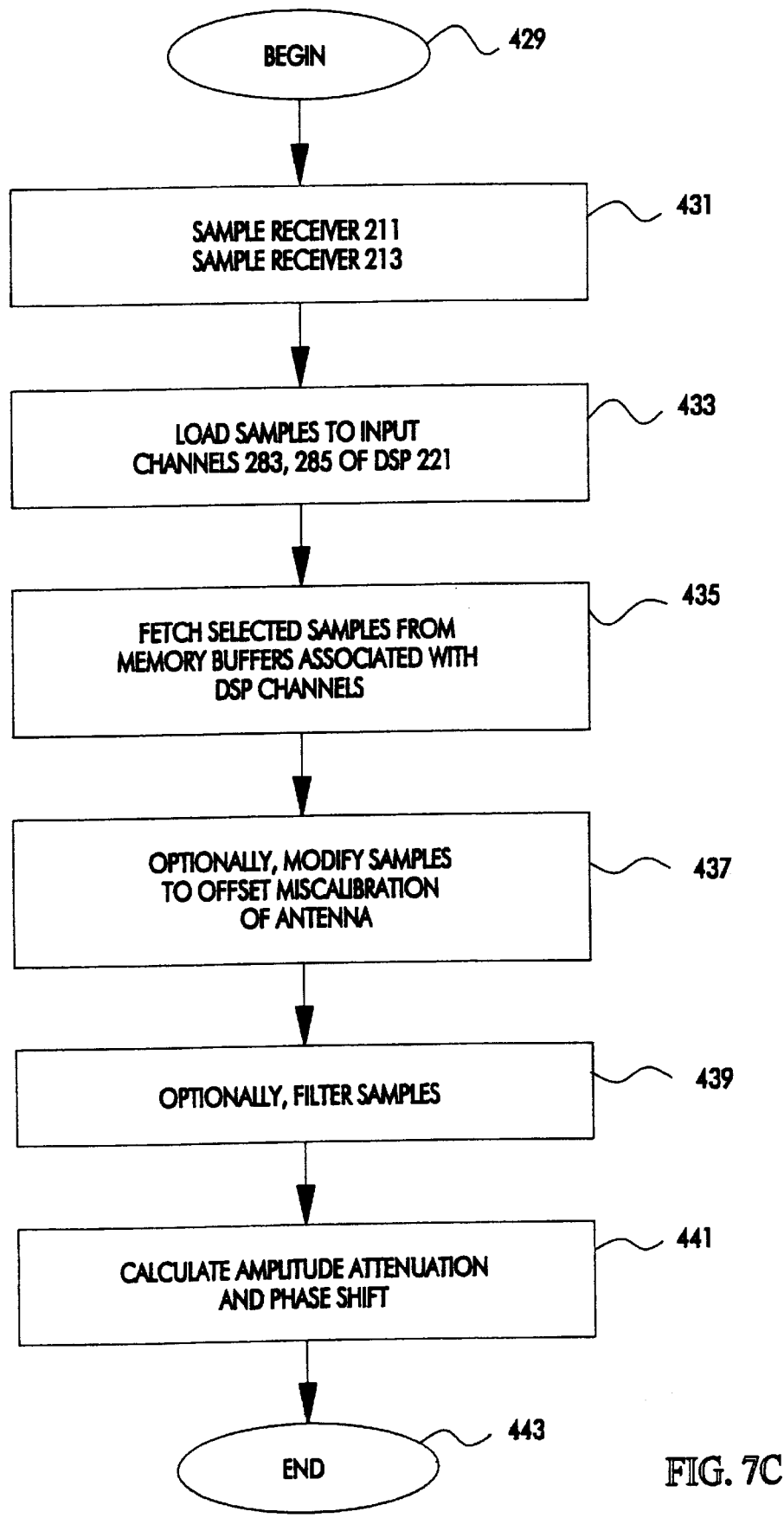

FIGS. 7A, 7B, and 7C provide high level flowchart representations of logging operations performed in accordance with the preferred embodiment of the present invention. FIG. 7A depicts logic steps which are performed by central processor 215. FIG. 7B represents operations controlled by processors 217, 219. FIG. 7C depicts operations controlled by digital signal processor 221 and central processor 215. The transmission operations begin at block 401. Processor 215 performs a calibration operation upon receiving antennas 211, 213, as will be discussed in greater detail elsewhere in this application. After the calibration operations are performed central processor 215 instructs processor 217 to energize transmitting antenna 203 with a 400 kiloHertz current. Then, in accordance with block 407, central processor 215 instructs processor 219 to energize transmitting antenna 209 with a 400 kiloHertz current. Next, central processor 215 instructs processor 217 to energize transmitting antenna 205 with a 2 megaHertz current, in accordance with block 409. Then, in occurrence with block 411, central processor 215 instructs processor 219 to energize transmitting antenna 207 with a 2 megaHertz current. The process stops at block 413. In actual practice, transmission operations will be performed continuously over predefined intervals.

FIG. 7B depicts the control operations performed by processors 217, 219 to cause numerically controlled oscillators 223, 225 to energize particular transmitters. The process begins at block 415. It continues at block 417, wherein the processor 217 or 219 clears the registers in numerically controlled oscillators 223 or 225 by providing the appropriate instruction. Then, in accordance with block 419, processor 217 or 219 loads a predetermined value to the FREQ0 register and the FREQ1 register. These values determine the frequency of the energizing current which is supplied to a particular transmitting antenna. Then, in accordance with block 421, processor 217 or 219 loads a predetermined phase value to the phase register of numerically controlled oscillator 223 or 225. Processor 217 or 219 then provides a binary command to the FSELECT input pin of numerically controlled oscillator 223 or 225 to select a particular frequency of operation. Then, in accordance with block 425, a particular time interval is allowed to pass. This time interval determines how many cycles of energizing current are applied to a particular transmitting antenna. The process ends at software block 427. Typically, each time processor 217 or 219 is instructed by central processor 215 to energize a particular transmitting antenna, the steps of FIG. 7B are performed.

FIG. 7C depicts in flowchart for the reception operations. The process begins at block 429. The process continues at block 431, wherein the current within receiving antennas 211, 213 are sampled by receiving circuit 231. Then, in accordance with block 433, these samples are loaded to the appropriate input channels 283, 285 of digital signal processor 221. In accordance with block 435, central processor 215 fetches selected samples from the memory buffers associated with the digital signal processor input channels. In accordance with block 437, optionally, samples may be modified to offset for error components due to "miscalibration" of the antenna, which will be described in greater detail elsewhere in this application. Next, in accordance with software block 439, the digital samples may be digitally filter with either a low-pass digital filter, high-pass digital filter, or a bandpass digital filter. Alteratively, the samples can be averaged over predefined intervals to provide stability to the samples and eliminate the influence of spurious or erroneous samples. Next, in accordance with block 441, the amplitude attenuation and phase shift are calculated, as is described elsewhere in this application. Finally, the process ends at block 443.

What is claimed is:

1. A method of well-logging in a borehole in order to generate log data for a particular formation, comprising:
   generating a model which maps, for a formation type similar to said particular formation, dielectric permitivity to anisotropic formation conductivity;
   making at least one measurement of said particular formation at a first interrogation frequency;
   making at least one measurement of said particular formation at a second interrogation frequency;
   utilizing said measurements and said model to calculate values of at least one of:
   (a) the horizontal and vertical conductivities of said particular formation;
   (b) the horizontal and vertical dielectric permitivity of said particular formation; and
   (c) a dip angle of said borehole.

2. A method of well-logging according to claim 1, wherein said model is comprised of machine-readable data.

3. A method of well-logging in a borehole in order to generate log data for a particular formation, comprising:
   generating a model which maps, for a formation type similar to said particular formation, dielectric permitivity to anisotropic formation conductivity;
   making at least one measurement of said particular formation at a first interrogation frequency;
   making at least one measurement of said particular formation at a second interrogation frequency;
   utilizing said measurements and said model to calculate values of at least one of:
   (a) the horizontal and vertical conductivities of said particular formation;
   (b) the horizontal and vertical dielectric permitivity of said particular formation; and
   (c) a dip angle of said borehole;
   wherein said steps of making at least one measurement comprise:
   (1) making at least one measurement of said particular formation at one particular interrogation frequency; and
   (2) making at least two measurements of said particular formation at a second particular interrogation frequency.

4. A method of well-logging according to claim 3, wherein said step of utilizing said measurements and said model to calculate comprises:
   wherein said first interrogation frequency comprises a frequency that is relatively low in comparison to said second interrogation frequency;
   utilizing said measurements and said model values to calculate at least one of the following:
   (a) the horizontal and vertical conductivities of said particular formation;
   (b) the horizontal and vertical dielectric permitivity of said particular formation; and
   (c) a dip angle of said borehole.

5. A method of well-logging in a borehole in order to generate log data for a particular formation, comprising:
   generating a model which maps, for a formation type similar to said particular formation, dielectric permitivity to anisotropic formation conductivity;
   making at least one measurement of said particular formation at a first interrogation frequency;
   making at least one measurement of said particular formation at a second interrogation frequency;
   utilizing said measurements and said model to calculate values of at least one of:
   (a) the horizontal and vertical conductivities of said particular formation;
   (b) the horizontal and vertical dielectric permitivity of said particular formation; and
   (c) a dip angle of said borehole;
   wherein said step of utilizing said measurements and said model value to calculate comprises:
   utilizing said measurements and said model values to calculate at least one of the following utilizing a four-dimension inversion:
   (a) the horizontal and vertical conductivities of said particular formation;
   (b) the horizontal and vertical dielectric permitivity of said particular formation; and
   (c) a dip angle of said borehole.

6. An apparatus for well-logging in a borehole in order to generate log data for a particular formation, comprising:
   a programmable controller;
   machine readable data which defines a model which maps, for a formation type similar to said particular formation, dielectric permitivity to anisotropic formation conductivity accessible by said programmable controller;

a transmitter and receiver assembly for:
- (a) making at least one measurement of said particular formation at a first interrogation frequency;
- (b) making at least one measurement of said particular formation at a second interrogation frequency;

program instructions for utilizing said measurements and said model to calculate values of at least one of:
- (a) the horizontal and vertical conductivities of said particular formation;
- (b) the horizontal and vertical dielectric permitivity of said particular formation; and
- (c) a dip angle of said borehole.

7. An apparatus for well-logging in a borehole in order to generate log data for a particular formation, comprising:

a programmable controller;

machine readable data which defines a model which maps, for a formation type similar to said particular formation, dielectric permitivity to anisotropic formation conductivity accessible by said programmable controller;

a transmitter and receiver assembly for:
- (a) making at least one measurement of said particular formation at a first interrogation frequency;
- (b) making at least one measurement of said particular formation at a second interrogation frequency;

program instructions for utilizing said measurements and said model to calculate values of at least one of:
- (a) the horizontal and vertical conductivities of said particular formation;
- (b) the horizontal and vertical dielectric permitivity of said particular formation; and
- (c) a dip angle of said borehole;

wherein said model comprises machine readable data.

8. An apparatus for well-logging according to claim 7, wherein said transmitter and receiver assembly make at least one measurement at one particular interrogation frequency and at least two measurements at a second particular interrogation frequency.

9. An apparatus for well-logging according to claim 7, wherein said program instructions include program instructions for determination of particular ones of horizontal and vertical conductivities and horizontal and vertical dielectric permitivities through an inversion process.

\* \* \* \* \*